United States Patent [19]

Stiefel et al.

[11] Patent Number: 4,510,260

[45] Date of Patent: Apr. 9, 1985

[54] SELF-PROMOTED MOLYBDENUM AND TUNGSTEN SULFIDE HYDROTREATING CATALYSTS FROM BIS(TETRATHIOMETALLATE) PRECURSORS

[75] Inventors: Edward I. Stiefel, Bridgewater; Wie-Hin Pan, Fanwood; Russell R. Chianelli, Somerville, all of N.J.

[73] Assignee: Exxon Research and Engineering Co., Florham Park, N.J.

[21] Appl. No.: 518,363

[22] Filed: Jul. 29, 1983

[51] Int. Cl.³ .......................... B01J 27/02; B01J 31/12
[52] U.S. Cl. .................................... 502/219; 502/221; 502/164; 502/220
[58] Field of Search ................ 502/164, 220, 221, 219

[56] References Cited

U.S. PATENT DOCUMENTS

| 2,192,125 | 2/1940 | Brown et al. | 502/220 X |
|---|---|---|---|
| 2,595,772 | 5/1952 | Daussat et al. | 252/439 |
| 2,715,603 | 8/1955 | Lanning et al. | 208/162 X |
| 2,891,003 | 6/1959 | Chervenak et al. | 208/216 |
| 2,914,462 | 11/1959 | Hemminger | 208/143 X |
| 3,074,783 | 1/1963 | Paull | 423/651 X |
| 3,116,234 | 12/1963 | Douwes et al. | 208/208 R |
| 3,148,135 | 9/1964 | Schlinger et al. | 208/58 |
| 3,159,688 | 12/1964 | Jennings et al. | 585/626 |
| 3,167,496 | 1/1965 | Solomon | 502/220 X |
| 3,245,903 | 4/1966 | Champagvot | 208/216 X |
| 3,454,656 | 8/1969 | Rausch | 208/57 |
| 4,151,190 | 3/1979 | Murchison et al. | 502/219 X |
| 4,171,258 | 10/1979 | Gasper | 208/136 X |
| 4,243,553 | 1/1981 | Naumann et al. | 502/220 |
| 4,243,554 | 1/1981 | Naumann et al. | 502/220 |
| 4,357,263 | 11/1982 | Heck et al. | 502/221 |
| 4,368,141 | 1/1983 | Kuker | 502/220 X |
| 4,414,406 | 11/1983 | Fields | 502/220 X |

OTHER PUBLICATIONS

Hydrodesulfurization Catalysts Prepared from $X(MS_4)_2{}^{2-}$ Thioheteroanions Containing Ni or Co and Mo or W:... Konings et al. Lab for Inorganic Chemistry Eindhoven U. of Technology The Netherlands, Jun. 23, 1983, Copyright 1982 Academic Press Inc., pp. 466–472.

Primary Examiner—William G. Wright
Attorney, Agent, or Firm—Edward M. Corcoran

[57] ABSTRACT

Self-promoted molybdenum and tungsten sulfide hydrotreating catalyst are formed by heating one or more carbon-containing, bis(tetrathiometallate) catalyst precursor hydrogen with a supported, self-promoted catalyst salts selected from the group consisting of $(NR_4)_2[M(WS_4)_2]$, $(NR_4)_x[M(MoS_4)_2]$ and mixtures thereof wherein R is one or more alkyl groups, aryl groups or mixture thereof, wherein promoter metal M is convalently bound in the anion and is Ni, Co or Fe and wherein x is 2 if M is Ni and x is 3 if M is Co or Fe in a non-oxidizing atmosphere in the presence of sulfur hydrogen, and hydrocarbon.

15 Claims, No Drawings

SELF-PROMOTED MOLYBDENUM AND TUNGSTEN SULFIDE HYDROTREATING CATALYSTS FROM BIS(TETRATHIOMETALLATE) PRECURSORS

BACKGROUND OF THE INVENTION

1. Field of the Invention

This invention relates to self-promoted molybdenum and tungsten sulfide hydrotreating catalysts. More particularly, this invention relates to self-promoted molybdenum and tungsten sulfide hydrotreating catalysts produced by heating one or more molybdenum and/or tungsten thioheteroanion catalyst precursor compounds containing the promoter metal as part of the precursor molecule in the presence of sulfur at elevated temperature for a time sufficient to form said self-promoted catalyst.

2. Background of the Disclosure

The petroleum industry is increasingly turning to coal, tar sands, heavy crudes and resids as sources for future feedstocks. Feedstocks derived from these heavy materials contain more sulfur and nitrogen than feedstocks derived from more conventional crude oils. Such feedstocks are commonly referred to as being dirty feeds. These feeds therefore require a considerable amount of upgrading in order to obtain usable products therefrom, such upgrading or refining generally being accomplished by hydrotreating processes which are well-known in the petroleum industry.

These processes require the treating with hydrogen of various hydrocarbon fractions, or whole heavy feeds, or feedstocks, in the presence of hydro-treating catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle or heavy distillate feeds and residual feeds, or fuels. In hydrorefining relatively light feeds, the feeds are treated with hydrogen, often to improve odor, color, stability, combustion characteristics, and the like. Unsaturated hydrocarbons are hydrogenated, and saturated. Sulfur and nitrogen are removed in such treatments. In the treatment of catalytic cracking feedstocks, the cracking quality of the feedstock is improved by the hydrotreating. Carbon yield is reduced, and gasoline yield is generally increased. In the hydrodesulfurization of heavier feedstocks, or residua, the sulfur compounds are hydrogenated and cracked. Carbon-sulfur bonds are broken, and the sulfur for the most part is converted to hydrogen sulfide which is removed as a gas from the process. Hydrodenitrogenation, to some degree, also generally accompanies hydrodesulfurization reactions. In the hydrodenitrogenation of heavier feedstocks, or residua, the nitrogen compounds are hydrogenated and cracked. Carbon-nitrogen bonds are broken, and the nitrogen is converted to ammonia and evolved from the process. Hydrodesulfurization, to some degree, also generally accompanies hydrodenitrogenation reactions. In the hydrodesulfurization of relatively heavy feedstocks, emphasis is on the removal of sulfur from the feedstock. In the hydrodenitrogenation of relatively heavy feedstocks, emphasis is on the removal of nitrogen from the feesdstock. Although hydrodesulfurization and hydrodenitrogenation reactions generally occur together, it is usually far more difficult to achieve effective hydrodenitrogenation of feedstocks than hydrodesulfurization of feedstocks.

Catalysts most commonly used for these hydro-treating reactions include materials such as cobalt molybdate on alumina, nickel on alumina, cobalt molybdate promoted with nickel, nickel tungstate, etc. Also, it is well-known to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603 discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum and tungsten sulfides have other uses as catalysts, including hydrogenation, methanation, water gas shift, etc., reactions.

In general, with molybdenum and other transition metal sulfide catalysts as well as with other types of catalysts, higher catalyst surface areas generally result in more active catalysts than similar catalysts with lower surface areas. Thus, those skilled in the art are constantly trying to achieve catalysts that have higher surface areas. More recently, it has been disclosed in U.S. Pat. Nos. 4,243,553 and 4,243,554 that molybdenum sulfide catalysts of relatively high surface area may be obtained by thermally decomposing selected thiomolybdate salts at temperatures ranging from 300°-800° C. in the presence of essentially inert, oxygen-free atmospheres. Suitable atmospheres are disclosed as consisting of argon, a vacuum, nitrogen and hydrogen. In U.S. Pat. No. 4,243,554 an ammonium thiomolybdate salt is decomposed at a rate in excess of 15° C. per minute, whereas in U.S. Pat. No. 4,243,553 a substituted ammonium thiomolybdate salt is thermally decomposed at a very slow heating rate of from about 0.5 to 2° C./min. The processes disclosed in these patents are claimed to produce molybdenum disulfide catalysts having superior properties for water gas shift and methanation reactions and for catalyzed hydrogenation or hydrotreating reactions.

Catalysts comprising molybdenum sulfide in combination with other metal sulfides are also known. Thus, U.S. Pat. No. 2,891,003 discloses an iron-chromium combination for desulfurizing olefinic gasoline fractions; U.S. Pat. No. 3,116,234 discloses Cr-Mo and also Mo with Fe and/or Cr and/or Ni for HDS; U.S. Pat. No. 3,265,615 discloses Cr-Mo for HDN and HDS; U.S. Pat. No. 3,245,903 discloses Fe-Mo and Fe-Co-Mo for lube oil refining; U.S. Pat. No. 3,459,656 discloses Ni-Co-Mo for HDS; U.S. Pat. No. 4,108,761 discloses Fe-Ni-Mo for HDN and U.S. Pat. No. 4,171,258 discloses Fe-Cr-Mo for HDS with steam.

SUMMARY OF THE INVENTION

It has now been discovered that self-promoted molybdenum and tungsten sulfide hydroprocessing catalysts are obtained by heating one or more carbon-containing, bis(tetrathiometallate) catalyst precursor salts selected from the group consisting of $(NR_4)_2[M(WS_4)_2]$, $(NR_4)_x[M(MoS_4)_2]$ and mixtures thereof, in a non-oxidizing atmosphere in the presence of sulfur and hydrogen at a temperature above about 150° C. for a time sufficient to form said catalyst, wherein ($NR_4$) is a carbon-containing, substituted ammonium cation and R is selected from the group consisting of (a) alkyl group, aryl group and mixture thereof and (b) mixtures of (a) with hydrogen, wherein promoter metal M is covalently bound in the anion and is Ni, Co or Fe and wherein x is 2 if M is Ni and x is 3 if M is Co or Fe. In a preferred embodiment, the substituted ammonium cation ($NR_4$) will contain only alkyl groups. It is also preferred to form the catalyst in the presence of a hydrocarbon. Self promoted means a promoted catalyst of this invention formed from a precursor wherein the promoter metal is covalently bound in the anion of the precursor salt as explained below.

Hydroprocessing processes is meant to include any process that is carried out in the presence of hydrogen including, but not limited to, hydrocracking, hydrodenitrogenation, hydrodesulfurization, hydrogenation of aromatic and aliphatic unsaturated hydrocarbons, methanation, water gas shift, etc. These reactions include hydrotreating and hydrorefining reactions, the difference generally being thought of as more of a difference in degree than in kind, with hydrotreating conditions being more severe than hydrorefining conditions.

DETAILED DESCRIPTION OF THE INVENTION

As hereinbefore stated, the catalyst precursor will be one or more carbon containing bis(tetrathiomolybdate) or bis(tetrathiotungstate) compounds of the formula $(NR_4)_2[M(WS_4)_2]$ or $(NR_4)_x[M(MoS_4)_2]$ wherein the promoter metal M is covalently bound in the anion and is Ni, Co or Fe and wherein x is 2 if M is Ni and x is 3 if M is Co or Fe. As hereinbefore stated, R is a proton, an alkyl group, an aryl group or mixture thereof and preferably one or more alkyl groups. These bis(tetrathiometallate) anions have the structure

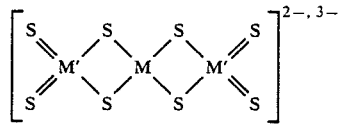

wherein M' is either Mo or W, and the promoter metal M is tetracoordinated with four sulfur atoms with each of the two tetrathiometallate groups providing two of the said four sulfur atoms. Thus, it will be appreciated that the charge, 2− or 3−, on the bis(tetrathiometallate) anion will depend on the charge or oxidation state of the promoter metal M. The bis(tetrathiotungstate) and bis(tetrathiomolybdate) anions, $[M(WS_4)_2]$ and $[M(MoS_4)_2]$, will have a charge of 2− when the oxidation state of the promoter metal M is 2+. In contrast, they will have a charge of 3− if the oxidation state of promoter metal M is 1+. The precursors useful in this invention may be prepared in both non-aqueous media and mixed aqueous/non-aqueous media. With the exception of compounds containing the cobalt bis(tetrathiomolybdate) trianion, many compounds useful as catalyst precursors in this invention and the methods used to prepare them may be found in an article by Callahan and Piliero titled "Complexes of $d^8$ Metals with Tetrathiomolybdate and Tetrathiotungstate Ions. Synthesis, Spectroscopy and Electrochemistry," Inorg. Chem., 19, n.9, 2619–2629 (1980) and in a review article by A. Muller et al in Chem. Rev. 104, 975 (1971), the disclosures of which are incorporated herein by reference.

Except for compounds containing the cobalt bis(tetrathiomolybdate) anion, compounds useful as catalyst precursors in this invention may be prepared, for example, in mixed aqueous/non-aqueous media such as an equal volume mixture of water and acetonitrile. Thus, one may form separate solutions of a simple salt of the promoter metal (i.e., a halide, sulfate, etc.) and an ammonium thiotungstate or thiomolybdate in the mixed media. These solutions will then be mixed, preferably at relatively low temperature and under anaerobic conditions. A salt of a suitable cation (i.e., $NR_4Cl$) may be added to the promoter salt solution or to the mixture of promoter metal salt and ammonium thiometallate. The catalyst precursor $(NR_4)_x[M(M'S_4)_2]$ precipitates out of solution. The catalyst precursor compounds useful in this invention are stable in the presence of oxygen or air if they are kept dry, except for the $(NR_4)_3[Fe(MoS_4)_2]$ and $(NR_4)_3[Co(MoS_4)_2]$ precursor compounds which should be kept both dry and under anaerobic conditions.

Compounds of the formula $(NR_4)_3[Co(MoS_4)_2]$ containing the cobalt bis(tetrathiomolybdate) trianion $[Co(MoS_4)_2]^{3-}$ of the structure set forth above wherein the cobalt is in the 1+ oxidation state have been prepared in non-aqueous media using mono, di and trivalent cobalt containing compounds. If the cobalt in the cobalt containing starting material is in the monovalent or 1+ oxidation state, a reducing agent need not be present in the reaction media. However, a non-oxidizing environment is essential to form the trianion in significant amounts irrespective of whether the cobalt in the starting material is in the mono, di or trivalent state. These compounds are preferably formed under anaerobic conditions. Illustrative, but non-limiting examples of monovalent cobalt starting materials useful for forming compounds containing the trianion $[Co(MoS_4)_2]^{3-}$ include cyclopentadienyl cobalt dicarbonyl—$(C_5H_5)Co(CO)_2$, hydridocobalt tetracarbonyl—$HCo(CO)_4$ and cyclopentadienyl cobalt cyclooctatetraene—$(C_5H_5)Co(C_8H_8)$.

When using a cobalt containing starting material wherein the cobalt is di or trivalent, it is necessary for the cobalt to be converted to the monovalent form during the reaction in order for the product to be formed. The conversion into the monovalent cobalt form can be effected by the presence of sufficient reducing agent in the reaction medium. The reducing agent may be added to the reaction medium or it may be part of the cobalt containing compound used as one of the starting materials.

When a compound containing a divalent or trivalent cobalt atom is used as a starting material, it is necessary for the cobalt to be converted to the monovalent form during the formation of the bis(tetrathiomolybdate) trianion. The following reaction sequence illustrates the formation of $(NR_4)_3[Co(MoS_4)_2]$ from $CoCl_2$ and be present in the feed as gaseous hydrogen, a hydrogen-bearing gas such as H₂S, one or more hydrogen donor hydrocarbons such as tetralin, or combination thereof.

The invention will be more readily understood by reference to the following examples.

EXAMPLE 1

1.3 ml of HSC$_6$H$_5$ and 1.75 ml of N(C$_2$H$_5$)$_3$ were added to a suspension of 0.669 g of CoCl$_2$ in CH$_3$CN. The resulting green solution was added to a suspension of 4.9 g of [N(C$_2$H$_5$)$_4$]$_2$MoS$_4$ in CH$_3$CN. The mixture was stirred and a dark green solution gradually resulted. Within 30 minutes, the reaction was completed and the solution was filtered. The product, [N(C$_2$H$_5$)$_4$]$_3$[Co(MoS$_4$)$_2$] was precipitated by adding diethylether to the filtrate. The precipitated product was filtered, washed with diethylether, methanol and diethylether again. One gram of this catalyst precursor was pressed under 15,000–20,000 psi and then sieved through 10/20 mesh or 20/40 mesh sieves. One gram of this meshed catalyst precursor was mixed with 10 g of 1/16-in. spheroid porcelain beads and placed in the catalyst basket of a Carberry-type autoclave reactor. The remainder of the basket was filled with more beads. The reactor was designed to allow a constant flow of hydrogen through the feed and to permit liquid sampling during operation.

After the catalyst precursor and beads were charged to the reactor, the reactor system was flushed with helium for about 30 minutes after which hydrogen flow through the reactor was initiated at a rate of 100 cc/min. After the hydrogen began flowing through the reactor, the reactor was charged with 100 cc of a feed comprising a DBT/Decalin mixture which was prepared by dissolving 4.4 g of dibenzothiophene (DBT) in 100 cc of hot Decalin. The solution thus contained about 5 wt.% DBT or 0.8 wt.% S. The hot feed solution was filtered and 1 cc of decane was added.

After the feed was charged to the reactor, the hydrogen pressure was increased to about 450 psig and the temperature in the reactor raised from room temperature to about 350° C. over a period of about ½ hour during which time the catalyst was formed in-situ in the reactor. The hydrogen flow rate through the reactor was maintained at about 100 cc per minute. When the desired temperature and pressure were reached, a GC sample of liquid was taken and additional samples taken at one hour intervals thereafter. The liquid samples from the reactor were analyzed using a Gow Mac Series 550 Gas Chromatograph.

As the reaction progressed, samples of liquid were withdrawn once an hour and analyzed by GC chromatography in order to determine the activity of the catalyst towards hydrodesulfurization as well as its selectivity for hydrogenation. The hydrodesulfurization activity was determined according to the following model reaction:

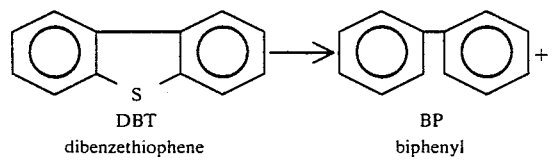

DBT  
dibenzethiophene

BP  
biphenyl

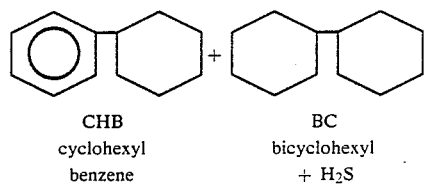

CHB  
cyclohexyl benzene

BC  
bicyclohexyl  
+ H₂S

The hydrodesulfurization zero order rate constant, r, for the catalyst was found to be 370×10$^{16}$ molecules of DBT desulfurized per gram of MoS$_2$ in the catalyst per second as shown in the Table. This rate is significantly higher than that of a catalyst formed from (NH$_4$)$_2$MoS$_4$ and tested in a similar manner which had a rate constant, r, of 45×10$^{16}$.

EXAMPLE 2

The Co complex, [N(C$_2$H$_5$)$_4$]$_2$[Co(WS$_4$)$_2$], was prepared in a manner similar to that described by Callahan and Piliero for the preparation of Ni(WS$_4$)$_2$$^{2-}$. Thus CoCl$_2$.6H$_2$O (1.54 g) in a mixture of 40 ml water and 40 ml CH$_3$CN was acidified with about 4 ml glacial acetic acid. This solution was deaerated with argon gas for about 5–10 mins. after which it was added, dropwise, to a similarly deaerated, stirred solution of 4.34 g (NH$_4$)$_2$WS$_4$ in 160 ml of a 1:1 mixture of CH$_3$CN/H$_2$O. A black solution formed. After addition was completed, 6 g. [N(C$_2$H$_5$)$_4$]Br in 60 ml of a 1:1 mixture of CH$_3$CN/H$_2$O (deaerated with argon) was added to the black solution. A brown crystalline precipitate of [N(C$_2$H$_5$)$_4$]$_2$[Co(WS$_4$)$_2$] formed. After stirring for 30 minutes at 0° C., the product, [N(C$_2$H$_5$)$_4$]$_2$[Co(WS$_4$)$_2$], was filtered under argon, washed with water, then methanol followed by diethyl ether and air dried. The yield was 5.3 g (89%).

A catalyst was formed in-situ and its activity was measured using the same procedure described in Example 1. The resulting in-situ formed catalyst had a rate constant of 167×10$^{16}$ molecules of DBT converted/sec.-gm of WS$_2$ as shown in the Table. This example shows that compounds containing the bis(tetrathiotungstate) dianion are useful precursors for forming the catalysts of this invention.

EXAMPLE 3

A nickel self-promoted catalyst precursor, [N(C$_3$H$_7$)$_4$]$_2$[Ni(MoS$_4$)$_2$], was prepared using known literature methods in an analogous fashion to Example 2. Thus, (NH$_4$)$_2$MoS$_4$ (15.3 g) was partially dissolved in 180 ml of a 1:1 (by volume) mixture of water and CH$_3$CN. The solvent mixture was previously deaerated with argon gas for a period of about 10 minutes. To the above stirred solution was added slowly a deaerated solution mixture of NiCL$_2$.6H$_2$O (6.75 g) and [N(C$_3$H$_7$)$_4$]Br in 180 ml of a 1:1 (by volume) mixture of water and CH$_3$CN. The reaction mixture was cooled to 0° C. in an ice bath. The red catalyst precursor product was filtered in air, washed with methanol and ether, then dried under vacuum for several hours. The yield was practically quantitative. The precursor was sieved, etc. and a catalyst formed in-situ using the procedure in Example 1.

The activity of the resulting catalyst was found to be 239×10$^{16}$ molecules of DBT converted/sec.-gm of MoS$_2$ as shown in the Table.

$(NR_4)_3(MoS_4)$ in the presence of a reducing agent such as an organic thiolate, $SR^-$, wherein R is hydrogen, an alkyl group, an aryl group or mixture thereof and preferably an alkyl group.

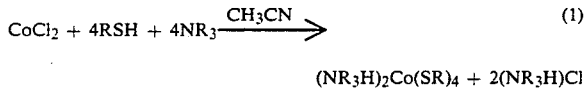

$$CoCl_2 + 4RSH + 4NR_3 \xrightarrow{CH_3CN} (NR_3H)_2Co(SR)_4 + 2(NR_3H)Cl \quad (1)$$

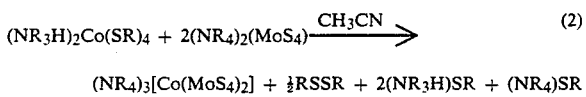

$$(NR_3H)_2Co(SR)_4 + 2(NR_4)_2(MoS_4) \xrightarrow{CH_3CN} (NR_4)_3[Co(MoS_4)_2] + \tfrac{1}{2}RSSR + 2(NR_3H)SR + (NR_4)SR \quad (2)$$

Thus when the simple salt $CoCl_2$, where the cobalt is divalent, is used as a starting material, it is first reacted with a thiolate reagent, $SR^-$, to form the anion $Co(SR)_4{}^{2-}$. The thiolate reagent $SR^-$ is generated by reacting the thiol RSH with a base. Although any base may be used, such as NaOH, it is preferred to use a nitrogen containing organic base such as pyridine, or a primary, secondary or tertiary amine. In equation (1) above, the base is a trialkylamine. Although only a stoichiometric amount of reducing agent $SR^-$ is needed to effect the reduction from $Co^{2+}$ to $Co^{1+}$, it is preferred to use an excess of reducing agent. The solution containing the anion $Co(SR)_4{}^{2-}$ is then added to the $(NR_4)_2MoS_4$, partially dissolved in $CH_3CN$ (eq. 2). After a period of 30 to 60 minutes, the reaction is complete. Since the product $(NR_4)_3[Co(MoS_4)_2]$ is the least soluble in the reaction mixture, it can be readily precipitated out of the solution by adding diethylether to the reaction mixture.

When the cobalt starting material already contains the reducing agent bonded to it, for example $Co(S_2CNR'_2)_3$, it can be directly reacted with $(NH_4)_2MoS_4$. Equation 3 illustrates this reaction wherein R' is alkyl, aryl or mixture thereof, preferably alkyl.

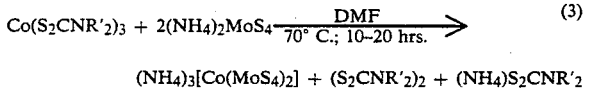

$$Co(S_2CNR'_2)_3 + 2(NH_4)_2MoS_4 \xrightarrow[70°C.;\ 10-20\ hrs.]{DMF} (NH_4)_3[Co(MoS_4)_2] + (S_2CNR'_2)_2 + (NH_4)S_2CNR'_2 \quad (3)$$

In this example, the cobalt starting material has cobalt in the trivalent state. Three equivalents of the reducing agent, N,N-dialkyl dithiocarbamate, $S_2CNR'_2{}^-$, are coordinated with the $Co^{3+}$. In this reaction, N,N-dimethylformamide is the preferred solvent. Further, this reaction requires heating at 70° C. and at least 10 hours for the reaction to give significant yield of the product. The reducing agent gets oxidized to tetraalkylthiuramdisulfide $(S_2CNR'_2)_2$ as the $Co^{3+}$ gets converted to $Co^{1+}$. Examples of other reducing agents that are capable of coordinating with cobalt include alkyl or aryl xanthates $(S_2COR'^-)$, o,o-dialkyldithiophosphates $(S_2P(OR')_2{}^-)$, dialkyldithiophosphinates $(S_2PR'_2{}^-)$ or thiolates $(SR'^-)$.

It should be understood that other reducing agents such as dithionite salts, borohydride salts, hydrazines, etc., can be used as the reductant in this synthesis route when other cobalt 2+ or 3+ compounds or complexes are used as the cobalt starting material. These include complex ions in which N, O, S or P are coordinated to the cobalt atom. Illustrative, but non-limiting examples of other suitable cobalt 2+ and 3+ compounds and complexes include salts of $Co(amine)_6{}^{2+,3+}$, $Co(acetylacetonate)_3$, salts of $[Co(NH_3)_5Cl]^{2+}$, etc.

The cobalt bis(tetrathiomolybdate) trianion compounds prepared as above were analyzed using a variety of analytical techniques. Thus, elemental analysis was done by using combustion analysis for carbon, nitrogen, hydrogen and sulfur while atomic absorption spectroscopy was used to analyze for the metals. Infrared and electronic absorption spectroscopy were also employed as well as magnetic susceptibility and X-ray powder diffraction spectroscopy. In the infra-red region, characteristic bands of the trianion of this invention, $Co(MoS_4)_2{}^{3-}$, were observed at 481 cm$^{-1}$, 466 cm$^{-1}$ and at 445 cm$^{-1}$. In the ultraviolet-visible-near infra-red region, a N,N-dimethylformamide solution of the $(NR_4)^+$ salt (wherein R was $C_2H_5$) displayed peaks at 825 nm, (400), 645 nm (6,600), 545 nm (5,300), 453 nm (sh) and at 394 nm (19,500). The parenthetical numbers are molecular extinction coefficients in units of liter mole$^{-1}$ cm$^{-1}$. The complex $(NR_4)_3[Co(MoS_4)_2]$ wherein $R=C_2H_5$ displayed a magnetic moment of 3.3 BM as determined by the Evans NMR method.

Inasmuch as compounds containing the cobalt bis(tetrathiomolybdate) trianion are sensitive to oxygen, they must be maintained under non-oxidizing and preferably anaerobic conditions.

The catalysts of this invention may be prepared by heating one or more catalyst precursor salts, in the presence of sulfur and hydrogen and at a temperature of from about 150°–600° C., for a time sufficient to form the catalyst. Preferably, the temperature will range from about 200°–500° C. and more preferably from about 300°–400° C. In a preferred embodiment the catalyst will be formed in the presence of a hydrocarbon, in addition to sulfur and hydrogen.

The sulfur required for the formation of the catalyst from the precursor should be present in an amount at least sufficient to achieve the desired stoichiometry of the resulting catalyst. It should be noted that it is possible to make catalysts of this invention using only the sulfur present in the precursor. However, it is preferred that additional sulfur be present during formation of the catalyst. This additional sulfur may be elemental sulfur or a sulfur-bearing compound other than the precursor. Preferably, sulfur will be present in the reaction zone in an amount in excess of the stoichiometrically required amount. The hydrogen required to form the catalyst may be present in the reaction as gaseous hydrogen, a hydrogen-bearing gas such as $H_2S$, one or more hydrogen donor hydrocarbons such as tetralin, or combination thereof. The catalyst will be formed from the precursor either ex-situ or in-situ in a sulfur bearing hydrocarbon feed.

In a preferred embodiment, the catalysts of this invention will be formed, ex-situ or in-situ, in the presence of any hydrocarbon that is convenient, including a heavy hydrocarbon oil having at least 10 weight percent of material boiling above about 1050° F. at atmospheric pressure, such as various residua, whole and topped crude oils, etc. Thus, the catalysts of this invention may be formed in situ in a sulfur-bearing feed merely by contacting one or more suitable precursor compounds useful in forming the catalysts of this invention with the feed and hydrogen at a temperature above about 150° C. and preferably above about 200° C. After the catalyst has been formed in-situ, the catalyst will then act to remove sulfur from said feed if hydrogen is present therein. As previously stated, the hydrogen may

EXAMPLE 4

A $[N(C_2H_5)_4]_2[Ni(MoS_4)_2]$ catalyst precursor was prepared using the same procedure in Example 3, except that $[N(C_2H_5)_4]Br$ was used instead of $[N(C_3H_7)_4]Br$. A catalyst was formed in-situ and tested using the procedure set forth in Example 1. The activity is listed in the Table and was $134 \times 10^{16}$.

EXAMPLE 5

Example 2 was repeated, but $NiCl_2 \cdot 6H_2O$ was used instead of $CoCl_2 \cdot 6H_2O$ which formed the catalyst precursor $[N(C_2H_5)_4]_2[Ni(WS_4)_2]$. The catalyst formed in-situ from this precursor had an activity of $169 \times 10^{16}$ and is set forth in the table.

EXAMPLE 6

Example 5 was repeated using $[N(C_3H_7)_4]Br$ instead of $[N(C_2H_5)_4]Br$ to form the catalyst precursor $[N(C_3H_7)_4]_2[Ni(WS_4)_2]$. The activity of the resulting catalyst is listed in the Table and was $164 \times 10^{16}$.

EXAMPLE 7

A $[N(C_2H_5)_4]_2[Fe(WS_4)_2]$ catalyst precursor was prepared using the method described by Muller et al [A. Muller and S. Sarker, Angew. Chem. Int'l., Ed. Engl., 16 (19), 705 (1977)]. Thus, 1.44 g of $FeSO_4 \cdot 7H_2O$ and 0.136 g of $N_2H_4 \cdot HCl$ were dissolved in 50 ml of degassed water to which was added a degassed solution of 4.59 g of $[N(C_2H_5)_4]_2WS_4$ in 50 ml of water. The precursor precipitated out of solution as a dark green precipitate which was filtered under argon, washed with water, ethanol and ether and then dried. This yielded 2.6 g of catalyst precursor.

A catalyst was formed in-situ from the precursor and tested using the procedure in Example 1. The activity of the catalyst was $55 \times 10^{16}$ and is listed in the Table.

EXAMPLE 8

In this Example, a $[N(C_3H_7)_4]_3(Fe(MoS_4)_2]$ precursor was formed under nitrogen by first dissolving 21.0 g of $(NH_4)_2MoS_4$ and 44.8 g of $[N(C_3H_7)_4]Br$ in a mixture of 500 ml of $H_2O$ and 200 ml of $CH_3CN$. To this solution was added, with stirring, suspension of 15 g of $Fe(NH_4)_2SO_4$ in a mixture of 150 ml of $H_2O$ and 100 ml of $CH_3CN$. At first a brown precipitate formed. However, by the time that all of the suspension was added, a black tar and a purplish red suspension had formed. On standing overnight the black tar had solidified into a dark mass which was broken up in the suspension and stirred for a day to obtain a dark purplish precipitate. This precipitate was the catalyst precursor and was filtered, washed twice with water, washed with ethanol and dried under vacuum.

The procedure set forth in Example 1 was used both to form the catalyst from the precursor in-situ in the feed and evaluate the resulting catalyst. The resulting catalyst had an activity of $60 \times 10^{16}$ which is set forth in the Table.

EXAMPLE 9

This experiment used the same catalyst precursor feed and procedure, etc. as Example 1 to evaluate the catalyst. However, this experiment was different than Examples 1-8 in that the catalyst was not formed from the precursor in-situ in the feed solution, but was preformed in an $H_2S/H$ mixture prior to contacting the hot, sulfur bearing hydrocarbon feed. Thus, a catalyst was formed by contacting a precursor, $[N(C_2H_5)_4]_3[Co(MoS_4)_2]$ with a flowing mixture of 15% $H_2S$ in $H_2$ for one hour at 325° C. The activity of the catalyst was found to be $255 \times 10^{16}$.

Referring to the Table, it can be seen that when a catalyst was formed from the same precursor in-situ in the sulfur bearing feed, the HDS activity of the resulting catalyst was about twice that of a catalyst formed in an $H_2S/H_2$ mixture.

HDS ACTIVITY OF THIOHETEROANION DERIVED CATALYSTS[1]

| Example # | Precursor | % $MS_2$[2] | Activity × $10^{-16}$/gm Precursor[3] | Activity × $10^{-16}$/gm $MS_2$[3] |
|---|---|---|---|---|
| 1 | $[N(C_2H_5)_4]_3Co(MoS_4)_2$ | 35.7 | 167 | 468 |
| 2 | $[N(C_2H_5)_4]_2Co(WS_4)_2$ | 52.6 | 88 | 167 |
| 3 | $[N(C_3H_7)_4]_2Ni(MoS_4)_2$ | 36.4 | 87 | 239 |
| 4 | $[N(C_2H_5)_4]_2Ni(MoS_4)_2$ | 41.8 | 56 | 134 |
| 5 | $[N(C_2H_5)_4]_2Ni(WS_4)_2$ | 52.6 | 89 | 169 |
| 6 | $[N(C_3H_7)_4]_2Ni(WS_4)_2$ | 46.9 | 77 | 164 |
| 7 | $[N(C_2H_5)_4]_2Fe(WS_4)_2$ | 52.7 | 29 | 55 |
| 8 | $[N(C_3H_7)_4]_3Fe(MoS_4)_2$ | 30.1 | 18 | 60 |
| 9 | $[N(C_2H_5)_4]_3Co(MoS_4)_2$ | 63 | 161 | 255 |

[1] All catalysts were formed in-situ except for Example 9.
[2] Amount of $MS_2$ (M is Mo or W) contained in the precursor in percent.
[3] The activity is in molecules of DBT converted per sec per gm. precursor or $MS_2$.

EXAMPLE 10

In this experiment a sample of the $[N(C_3H_7)_4]_2[Ni(MoS_4)_2]$ catalyst precursor prepared in Example 3 was ground and pelletized to a 20/40 mesh size (Tyler) using a four percent aqueous solution of polyvinyl alcohol as a binder. The pelletized catalyst precursor was placed into a stainless steel reactor at 100° C. at atmospheric pressure where it was purged for one hour under nitrogen. Ten percent of hydrogen sulfide in hydrogen was introduced into the reactor at a space velocity of 0.75 SCF/hr for each 10 cc of catalyst precursor in the reactor. The temperature in the reactor was then raised to 325° C. and kept at this temperature for three hours to form the catalyst after which the temperature in the reactor was lowered to 100° C., the $H_2S/H_2$ gas flow was stopped and the reactor was purged with nitrogen until room temperature was reached.

About 20 cc of the catalyst was loaded into a fixed-bed reactor made out of ⅜ inch 316 stainless steel pipe which was equipped with a calibrated feed burette pump, gas-liquid separator and liquid product collector. The conditions in the reactor were as set forth below:

| | |
|---|---|
| Temperature | 325° C. |
| Pressure | 3.15 MPa |
| Hydrogen rate | 3000 SCF/bbl |
| LHSV | 3.0 |

The liquid product was analyzed for total sulfur by X-ray fluorescence and for nitrogen by combustion analysis. The feedstock used was a light catalytic cycle oil (LCCO) that was about 20 wt.% paraffinic having properties set forth in Table 2.

TABLE 2

| LCCO Feed | |
|---|---|
| Gravity (°API) | 18.6 |
| Sulfur, wt. % | 1.5 |
| Nitrogen, ppm | 370 |
| GC distillation | |
| Wt. % | Temp., °C. |

TABLE 2-continued

| | |
|---|---|
| 5 | 231 |
| 10 | 251 |
| 50 | 293 |
| 70 | 321 |
| 90 | 352 |
| 95 | 364 |

This catalyst was found to have an HDS rate constant ($K_{HDS}$) of 8.9 and an HDN ($K_{HDN}$) rate constant of 4.4. The rate constants for the hydrodesulfurization and hydrodenitrogenation reactions were calculated as follows:

$$K_{HDS} = \frac{LHSV}{S_f} \left( \frac{S_f}{S_p} - 1 \right)$$

$$K_{HDN} = (LHSV) \ln \left( \frac{N_f}{N_p} \right)$$

wherein $S_f$ and $S_p$ are the weight percent of sulfur in the feed and product, respectively and $N_f$ and $N_p$ are the weight percent of nitrogen in the feed and product, respectively. It should be noted that the catalyst of this invention had a much higher selectivity for nitrogen removal than commercial cobalt molybdate on alumina and nickel molybdate on alumina catalysts.

What is claimed is:

1. A self-promoted catalyst formed by heating one or more carbon-containing, bis(tetrathiometallate) catalyst precursor salts selected from the group consisting of $(NR_4)_2[M(WS_4)_2]$, $(NR_4)_x[M(MoS_4)_2]$ and mixtures thereof, in a non-oxidizing atmosphere in the presence of sulfur and hydrogen at elevated temperature for a time sufficient to form said catalyst, wherein ($NR_4$) is a carbon-containing, substituted ammonium cation and R is selected from the group consisting of (a) alkyl group, aryl group and mixture thereof and (b) mixtures of (a) with hydrogen, wherein promoter metal M is covalently bound in the anion and is Ni, Co or Fe and wherein x is 2 if M is Ni and x is i3 if M is Co or Fe.

2. The catalyst of claim 1 wherein said catalyst is formed in the presence of excess sulfur.

3. The catalyst of claim 2 wherein said elevated temperature is at least about 150° C.

4. The catalyst of claim 3 wherein said catalyst is formed in the presence of one or more hydrocarbons.

5. The catalyst of claim 4 formed at an elevated temperature of at least about 200° C.

6. The catalyst of claim 5 wherein said excess sulfur is in the form of one or more sulfur bearing compounds.

7. The catalyst of claim 6 wherein substituted ammonium cation ($NR_4$) contains only alkyl groups.

8. The catalyst of claim 7 wherein said non-oxidizing atmosphere comprises a mixture of $H_2$ and $H_2S$.

9. A self-promoted catalyst formed by heating one or more carbon-containing, bis(tetrathiometallate) catalyst precursor salts selected from the group consisting of $(NR_4)_2[M(WS_4)_2]$, $(NR_4)_x[M(MoS_4)_2]$ and mixtures thereof, in a non-oxidizing atmosphere in the presence of sulfur and hydrogen at a temperature above about 150° C. for a time sufficient to form said catalyst, wherein ($NR_4$) is a carbon-containing, substituted ammonium cation and R is selected from the group consisting of (a) alkyl group, aryl group and mixture thereof and (b) mixtures of (a) with hydrogen, wherein promoter metal M is covalently bound in the anion and is Ni, Co or Fe and wherein x is 2 if M is Ni and x is 3 if M is Co or Fe and wherein promoter metal M is tetracoordinated with four sulfur atoms with each of the two tetrathiometallate groups providing two of the said four sulfur atoms.

10. The catalyst of claim 9 wherein said catalyst is formed in the presence of excess sulfur.

11. The catalyst of claim 10 wherein said catalyst is formed in the presence of one or more hydrocarbons.

12. The catalyst of claim 11 formed at an elevated temperature of at least about 200° C.

13. The catalyst of claim 12 wherein said excess sulfur is in the form of one or more sulfur bearing compounds.

14. The catalyst of claim 13 wherein substituted ammonium cation ($NR_4$) contains only alkyl groups.

15. The catalyst of claim 14 wherein said non-oxidizing atmosphere comprises a mixture of $H_2$ and $H_2S$.

* * * * *